Nov. 15, 1927.
J. A. CURDY
1,649,154
LINE TRAVERSER FOR FISHING REEL LINES
Filed July 1, 1926
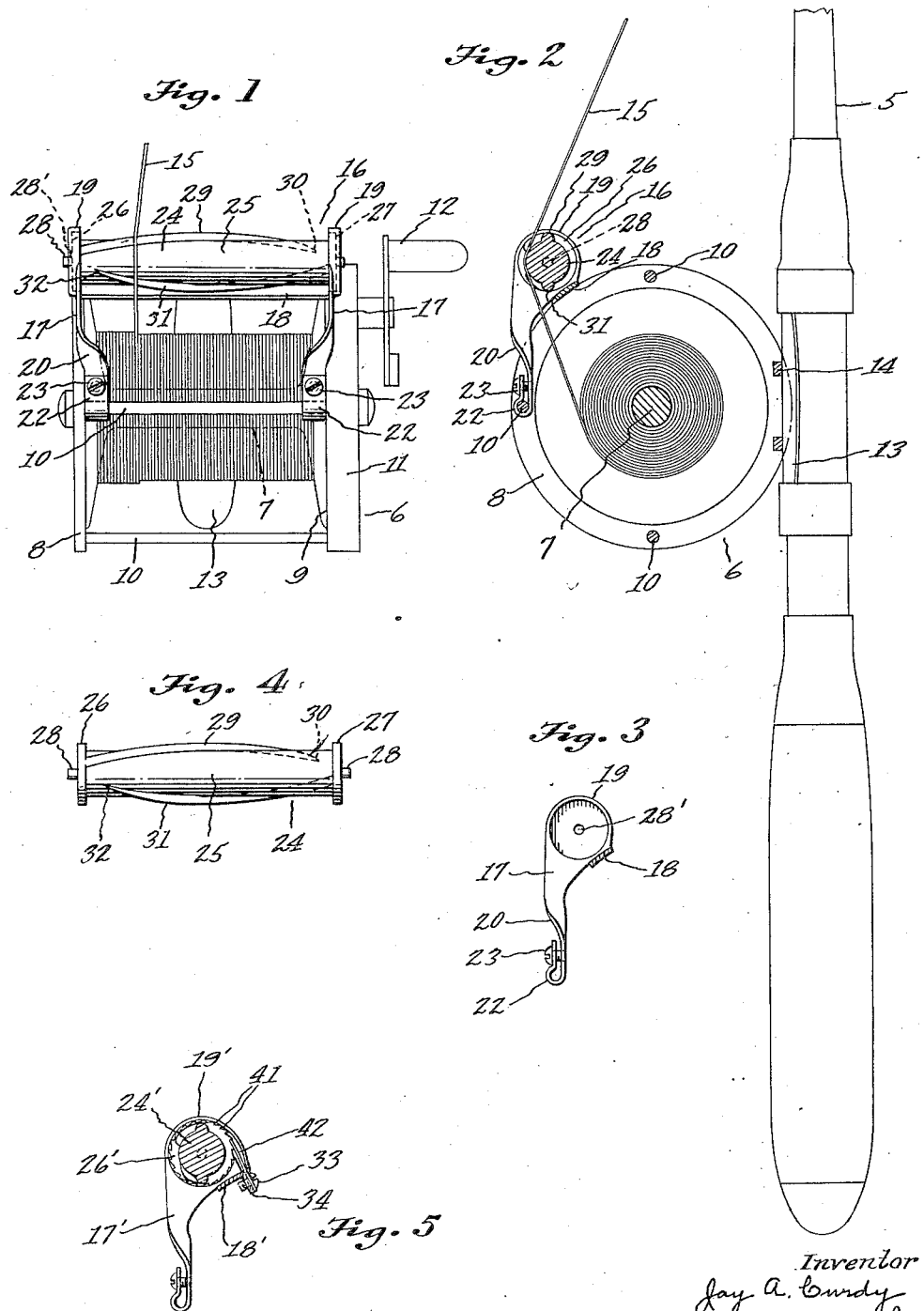

Patented Nov. 15, 1927.

1,649,154

UNITED STATES PATENT OFFICE.

JAY A. CURDY, OF CLEVELAND, OHIO.

LINE TRAVERSER FOR FISHING-REEL LINES.

Application filed July 1, 1926. Serial No. 119,867.

This invention relates to new and useful improvements in line traversers and more particularly for fishing reel lines, providing means independent of the fishing reel mechanism for reciprocating the fishing line transversely across the reel spool as the line is wound in, insuring even and level winding of the line upon the fishing reel spool, and allowing the line when casting to play or run out freely without undue frictional resistance of the winder.

Another object of the invention is to embody the line traverser in a fishing reel structure independent of the line winding mechanism of the reel, and to apply the level winder in the form of an attachment to the ordinary fishing reel.

Other objects and features of the invention will be hereinafter pointed out and described.

In the drawings:—

Fig. 1 is a top view of the traverser embodied in the form of an attachment applied to an ordinary fishing reel;

Fig. 2 is a sectional view through the attachment and fishing reel with the reel mounted on a fishing rod;

Fig. 3 is a detail sectional view of the attachment bracket;

Fig. 4 is a detail view of the traverser roller;

Fig. 5 is a sectional view of a modified form of traverser attachment.

Referring specifically to the drawings, 5 indicates a fishing rod having an ordinary fishing reel mounted thereon comprising a flanged fishing line winding spool 7 journaled in side walls 8 and 9 braced by tie rods 10. The side wall 9 has a casing 11 secured thereon in which are mounted the spool driving gears driven by a winding crank 12. The reel is mounted on the fishing rod 5 by means of a base plate 13 secured to the bottom sides of tie bars 14. The fishing line is indicated at 15.

The line traverser embodied in the attachment form 16 as shown in the drawings comprises oppositely arranged clamping journal bracket arms 17 spaced by a joining cross bar 18. Each bracket arm 17 has a journal opening 28' concentric with an inward cup-shaped guard flange 19 formed thereon. The bracket arms 17 are offset as at 20 with the ends formed at right angles and looped as at 22 for clamping purposes by means of screws 23.

The line level winder or traverser roller indicated generally at 24 comprises a roller body 25 having flanged ends 26 and 27 and journal studs 28. The roller body 25 has right and left hand arranged spiral ribs 29 and 31 formed thereon with tapered ends 30 and 32 respectively. The spiral ribs 29 are joined to flange 26 and the tapered end 30 thereof is spaced from the roller flange 27 and rib 31. The spiral rib 31 is joined to roller flange 27 and the tapered end 32 thereof is spaced from roller flange 26 and rib 29.

The roller journals 28 are mounted in bracket bearing openings 28' with the roller flanges 26 and 27 lying within the bracket guard flanges 19.

To apply the line level winder attachment to an ordinary fishing reel, the bracket ends 22 are looped about the reel top tie bar 10 and clamped by screws 23. The bracket cross bar 18 is positioned on the periphery of the reel sides 8 and 9 over the front of the reel. The fishing line 15 is brought over the level winder roller 24 to the winding spool 7.

In operation during fishing, the fishing line 15 when casting out runs freely over the roller 25. When winding the line in on the reel spool, viewing Fig. 1, the friction of the line drawn in tension on the roller 25 causes the roller to turn therewith. As the line frictionally turns the roller, the spiral roller rib 29 engages the line forcing it over transversely to the right to the tapered end 30. The turning roller 25 next engages the spiral 31 with the line 15 forcing it over transversely to the left to the tapered rib end 32. As the roller 25 turns the line is again picked up by rib 29 repeating the operation over and over again. In this manner the line is reciprocated back and forth transversely while winding in causing the line to wind evenly and level on the winding spool of the reel.

In the modified form of level line winder attachment shown in Fig. 5 a flange 26' of the roller 24' is provided with ratchet teeth 41 positioned within the guard flange 19' of a bracket 17'. The ratchet teeth 41 are engaged by a spring pawl 42 secured by a screw 33 to an ear 34 formed on a cross bar 18'. The spring pawl 42 permits the line level winder roller 24' to function while winding the fishing line in, but holds the roller 24' stationary while casting the line out.

In both forms the traversing ribs 29 and 31 describe a very high pitched spiral each extending around approximately one fourth of the circumference of the roller. This gives a quick traverse essential to lay the line in single layers back and forth, with an absence of grooves or threads apt to fill with dirt and clog; and there is very little side strain on the line.

It is to be understood that the invention is not limited to the specific construction herein illustrated and described but can be embodied in other forms without departure from its spirit.

I claim:—

1. A line traverser for reels, comprising a roller mounted adjacent the reel, said roller having a pair of oppositely curved spiral ribs thereon, over which the line passes in contact, each rib terminating at one end short of the end of the roller.

2. A line traverser for reels, comprising a roller mounted adjacent the reel, said roller having a pair of oppositely curved spiral ribs thereon, over which the line passes in contact, each rib terminating at one end short of the end of the roller, the said end of each rib being tapered down to the surface of the roller.

3. A line traverser for reels, comprising a roller mounted adjacent the reel, said roller having a pair of oppositely curved spiral ribs thereon, over which the line passes in contact, each rib terminating at one end short of the end of the roller, and pawl and ratchet means to prevent turn of the roller by outgoing run of the line.

4. The combination with a fishing reel having a cross bar between its opposite side frames, of a line traverser comprising a pair of arms clamped to the cross bar, a roller carried by said arms, and means on the roller engaged by the line to shift the line in opposite directions alternately as the line is drawn thereover.

5. A line traverser comprising a roller having flanges at the ends, and a pair of oppositely curved spiral ribs projecting from the surface of the roller and over which the line passes in contact, each rib being joined at one end to one of the flanges and terminating at the other end short of the other flange.

6. A line traverser comprising a roller having flanges at the ends, and a pair of oppositely curved spiral ribs projecting from the surface of the roller and over which the line passes in contact, each rib being joined at one end to one of the flanges and terminating at the other end short of the other flange, the last mentioned end of each rib being inclined into the surface of the roller.

7. A line traverser comprising a pair of arms having cupped ends with bearing holes therein, a roller having ends fitting in said cups, and journals projecting into said holes, and means on the roller to shift the line back and forth along the same as it is drawn thereover.

In testimony whereof, I do affix my signature.

JAY A. CURDY.